INVENTOR.
H. M. Stueland

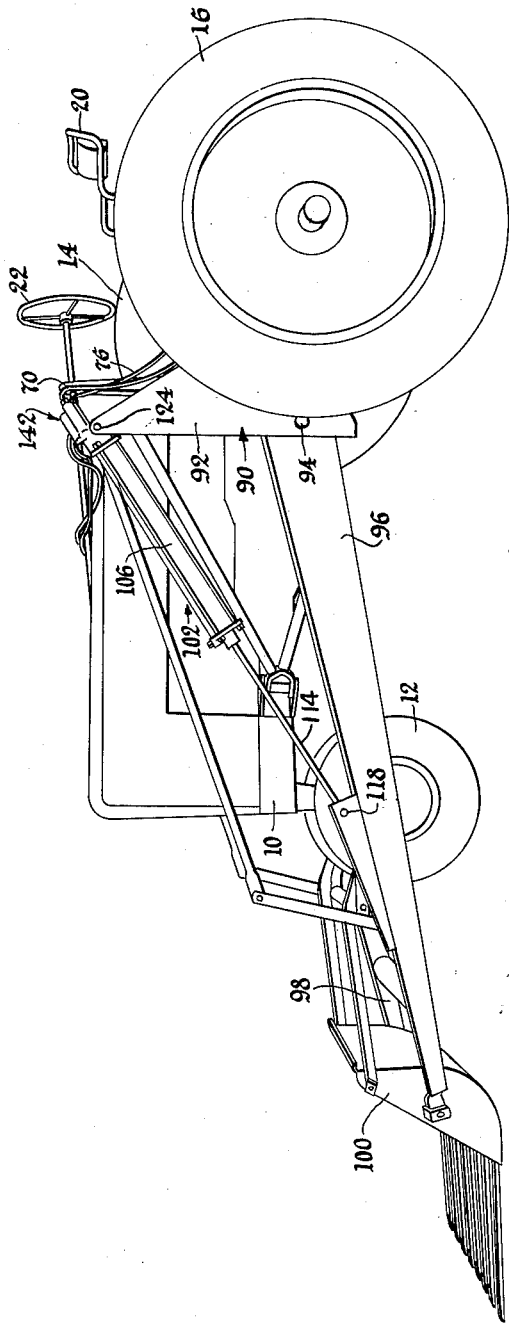

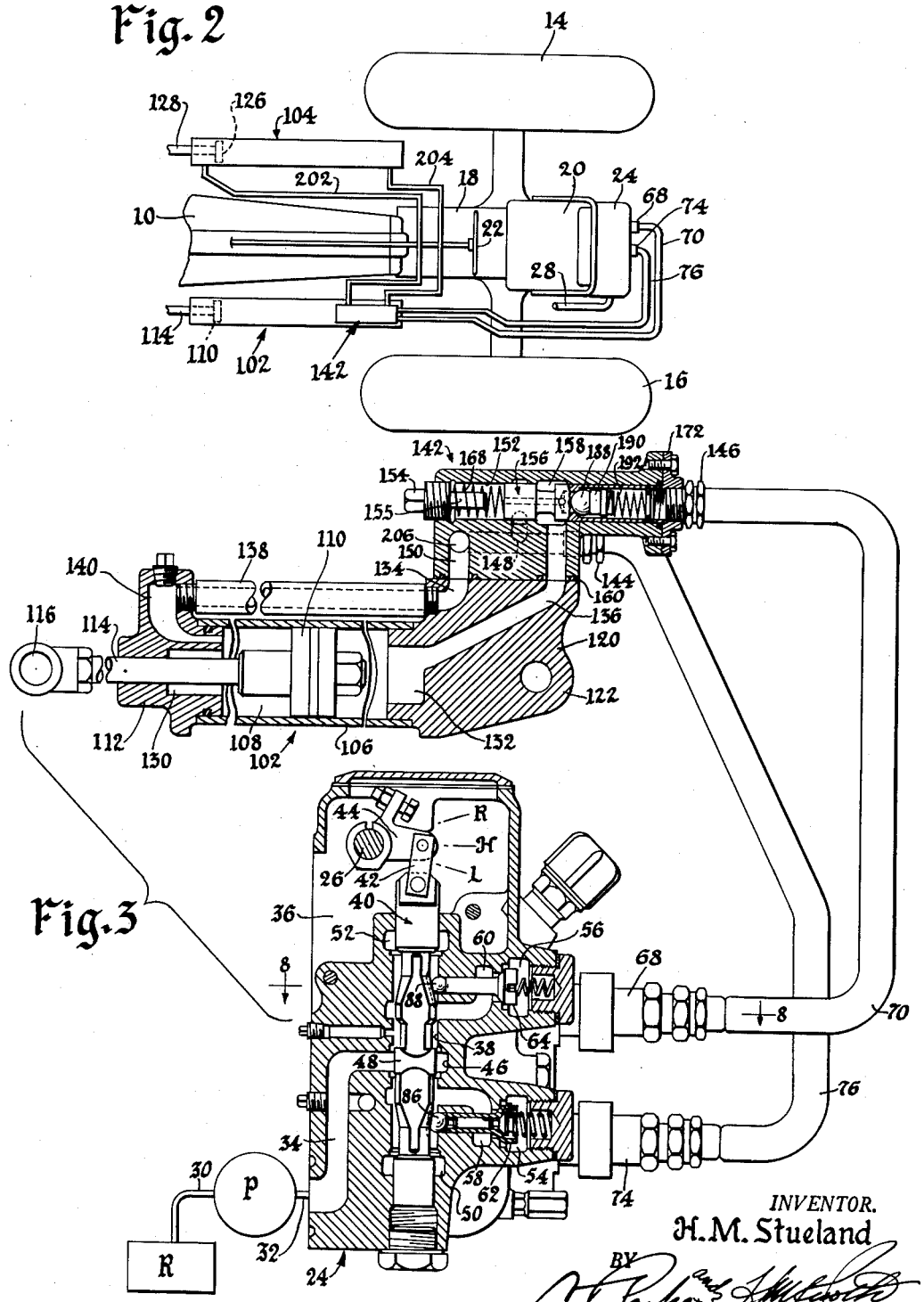

Jan. 3, 1956 H. M. STUELAND 2,729,224
FLUID-PRESSURE CONTROL SYSTEM
Filed June 6, 1952 4 Sheets-Sheet 4

INVENTOR.
H. M. Stueland
BY
Attorneys

United States Patent Office 2,729,224
Patented Jan. 3, 1956

2,729,224

FLUID-PRESSURE CONTROL SYSTEM

Harold M. Stueland, East Moline, Ill., assignor to Deere & Company, Moline, Ill., a corporation of Illinois Application June 6, 1952, Serial No. 292,172

8 Claims. (Cl. 137—102)

This invention pertains to hydraulic control means for material-handling apparatus such as typified by the well-known manure loader that is finding increased favor in the agricultural field.

A typical loader of the character referred to comprises a pair of lift arms or booms mounted at their rear ends on a transverse pivot axis to a rear part of the tractor so that the booms or arms extend forwardly to carry a scoop or bucket ahead of the tractor. Most agricultural tractors of recent make are either equipped or can be provided with hydraulic power means which furnishes an adequate source for raising and lowering the lift arms. Although a loader of this character is put to several uses, its primary purpose is the loading of manure or other material and accordingly the machine must be designed so that it can operate rapidly and efficiently. In the case of loading manure, for example, the range of elevation is normally only between the ground and the top of the manure spreader body, in which case, the bucket is operated through a sequence that includes loading, raising, dumping and lowering. A skillful operator can handle this job quite efficiently but there is still room for improvement. According to the present invention, a major improvement is made in the control by providing means whereby the bucket may be lowered more rapidly than has heretofore been possible. This result is accomplished by the provision of a hydraulic control in which fluid exhausted by the hydraulic cylinder or cylinders is short-circuited into the opposite end of the cylinder or cylinders so that it does not have to travel to the relatively remotely located reservoir. It will be appreciated that as the piston moves outwardly (or inwardly) in the cylinder, the chamber at the other end of the cylinder increases and provides an ideal reservoir. The normal one-way system or even the conventional two-way system does not operate in this fashion and, because of the many restrictions set up in the circuit, lowering or rapid movement in a certain direction is dependent upon the capacity of the fluid lines and reservoir to handle the returning fluid. Another feature of the present invention is that it is fundamentally adaptable to existing systems, as well as being capable of being designed basically into the original equipment.

It is an important object of the present invention to provide an auxiliary control valve for use with the main control valve of a fluid power system of the two-way type. One well-known type of agricultural tractor is either optionally or originally equipped with a hydraulic system of the type shown in U. S. Patent 2,532,552. This system includes a pump driven from any suitable source on the tractor for transmitting fluid under pressure to a distributing valve having a pair of motor ports. The control valve member is selectively positionable from a neutral position to either of two active positions for alternately connecting one of the motor ports to pump pressure and the other motor port to the reservoir. In the use of a tractor of this character with a loader of the nature described generally above, considerable revision in the hydraulic system has been necessary, because the loader can be raised and lowered by a one-way motor, whereas the hydraulic system of the tractor is a two-way system. According to the present invention, extensive revisions need not be made because there is provided by-pass control means for utilizing a one-way motor with the two-way hydraulic system. One of the motor ports is used to transmit pump pressure to one end of the motor for raising the loader. The other motor port is connectible to by-pass means for interconnecting opposite ends of the fluid motor so that upon lowering of the loader, one end will discharge to the other, thus supplementing the standard reservoir and materially accelerating lowering of the loader. At the same time, this addition to the system operates strictly under control of the original control valve and manual control lever therefor.

It is a further feature of the invention to utilize in conjunction with the by-pass valve a check-valve-control passage that is opened upon raising of the loader so that the low-pressure end of the fluid motor may discharge to the reservoir via the normally unusable motor port in the control valve. Thus, the modified system is completely flexible and may be economically and easily adapted for coordination of the loader requirements with the original or optional equipment of the tractor.

The foregoing and other important objects and desirable features inherent in and encompassed by the invention will become apparent as a preferred embodiment of the invention is disclosed in detail in the following description and accompanying sheets of drawings in which:

Figure 1 is a perspective view of a tractor-mounted loader.

Figure 2 is a top plan view of the rear portion of the tractor showing schematically the fluid pressure circuit involved.

Figure 3 is a sectional view on an enlarged scale showing the relationship between the distributing valve and the fluid motor.

Figure 4:
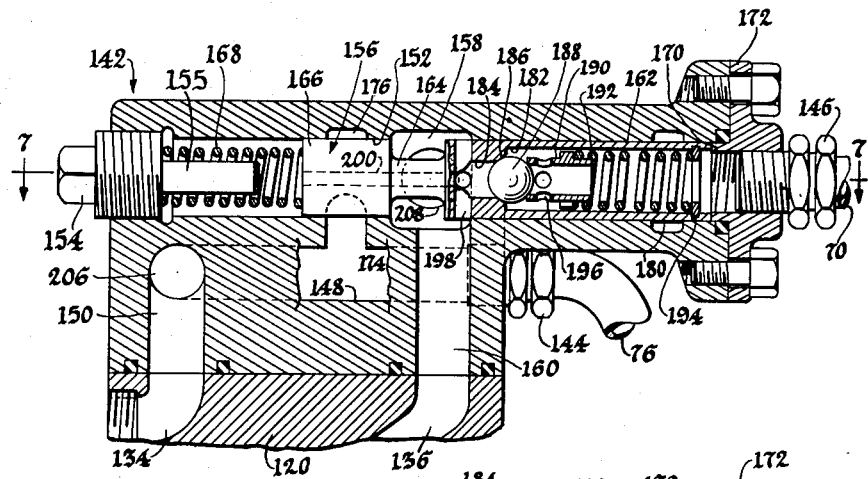
Figure 4 is a fragmentary sectional view on an enlarged scale showing the details of the by-pass control valve, this valve being shown in this figure in its neutral or "hold" position.

Reference will be had first to Figure 1 for a general description of the tractor and loader structure and the problems peculiar thereto.

The tractor chosen for the purposes of illustration is of a well-known type comprising a longitudinal body 10 carried at its front end on a steerable wheeled truck 12 and at its rear end on right- and left-hand transversely spaced apart traction wheels 14 and 16. The rear portion of the body 10 includes a conventional transmission and differential casing 18 above which is carried an operator's station 20. A steering wheel 22 is located ahead of the operator's station in conventional manner for steering the steerable wheeled truck 12.

The rear portion of the transmission casing 18 has removably secured thereto a distributing valve housing 24 having a transverse rockshaft 26 (Figure 3) under control of a manually operative control lever 28 that extends within convenient reach of the operator's seat 20.

Since the details of the hydraulic system illustrated herein are completely covered in the U. S. patent identified above, they will be only briefly described here. The tractor is furnished with a hydraulic pump, shown schematically in Figure 3 and designated by the letter P, which may be driven from any appropriate part of the tractor power train. This pump has its inlet 30 connected to a reservoir R and its outlet or high-pressure side 32 connected to a high-pressure passage 34 in the control valve housing 24. In the actual design of the tractor, the reservoir may be any suitable part of the transmission casing 18 and this reservoir may be supplemented by the interior of the control valve housing 24, as designated generally by the numeral 36 in Figure 3. In any event, no limiting importance is to be attached to the specific relationship of the pump, the reservoir, and the control valve housing 24, since equivalent parts may be conventionally found in many agricultural tractors and similar vehicles.

The following description of the details of the control valve housing 24 and its components will have specific reference to the parts as extending vertically, horizontally, etc., but it should be understood that such directional and positional language is not intended to impose any limitations upon the invention.

The housing 24 has therein a vertical valve bore 38 in which is axially shiftably carried a control valve member 40. This valve member is connected at its upper end by a link 42 to an arm 44 keyed to the rockshaft 26, so that rocking of the control lever 28 (Figure 2) in opposite directions will cause the valve member 40 to move upwardly or downwardly in the valve bore 38. As designated by the letters R, H and L in Figure 3, the valve member 40 has three positions; namely, "raise," "hold" or neutral, and "lower." In the particular type of control valve shown, these positions are the basic operating positions for using the tractor and its hydraulic system with a variety of controllable implements. Such implements, of course, are moved or otherwise adjusted through the medium of a fluid motor under the direction of the control valve.

The high-pressure passage 34 leads to an annular groove 46 surrounding a central portion of the control valve member 40. This central portion is in the form of a land 48 so dimensioned relative to the annular groove 46 as to permit pump pressure to flow axially in opposite directions through the valve bore 38 to lower and upper reservoir passages or ports 50 and 52, both of which lead to the reservoir 36–R. Thus, when the control valve member 40 is in its neutral or hold position, fluid is circulated by the pump at no appreciable pressure.

The control valve housing 24 has lower and upper or first and second motor ports 54 and 56 respectively connected by passages 58 and 60 with the valve bore 38. The port 54 is normally separated from the passage 58 by a spring-loaded check valve 62 and a similar check valve 64 achieves a similar result relative to the port 56 and passage 60. Therefore, when the control valve member 40 is in its neutral or hold position, the motor ports 54 and 56 are isolated from the high-pressure passage 34—46.

Figure 8:
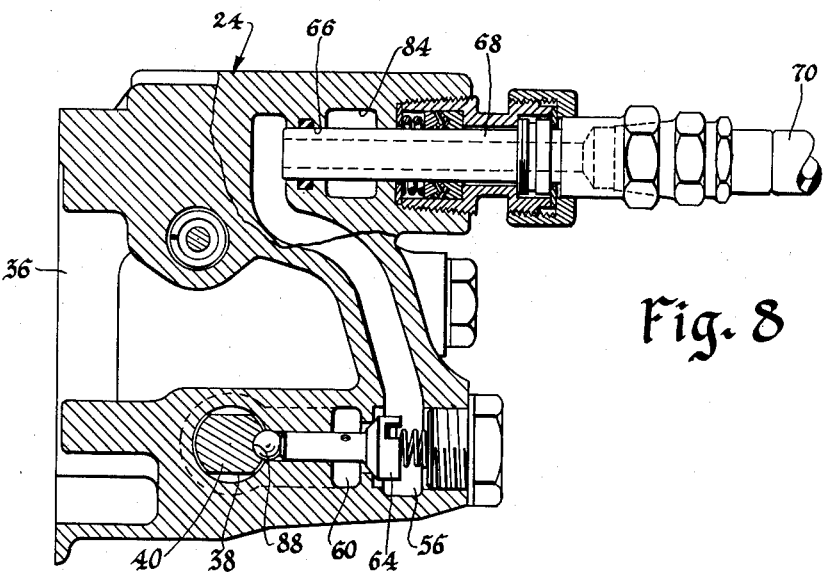
Figure 8 is an enlarged transverse sectional view taken on the line 8—8 of Figure 3.
Figure 9:
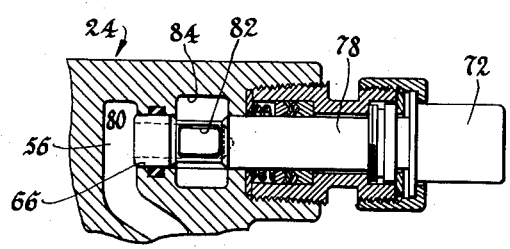
Figure 9 is a fragmentary sectional view showing the upper right-hand corner portion of Figure 8 and illustrating the replacement of the hose line with a plug.

As best shown in Figure 8, the motor port 56 leads to a rearwardly directed passage 66 which may be connected by a tubular coupling 68 to a fluid line 70 or which may be optionally closed by a removable plug 72 (Figure 9). The details of the lower motor port 54 are identical with respect to a tubular coupling 74 and a fluid line 76. When the coupling 74 is removed for the purposes of disconnecting the fluid line 76, it may be replaced by a plug (not shown) similar to the plug 72 shown in Figure 9.

It is a characteristic of the particular hydraulic system illustrated that the system may be used with or without the fluid lines 70 and 76, in which case, the couplings 68 and 74 are replaced by a pair of plugs such as 72. As shown in Figure 9, the plug 72 has an inner tubular portion 78 drilled at 80 to communicate with the port or passage 56 and having a side opening 82 for diverting fluid from the port or passage 56 into a cored passage 84. The cored passage leads to what is termed an integral cylinder (not shown here) usable in place of any fluid motor that may be connected to the fluid lines 70 and 76. The plug that is utilized in place of the coupling 74 is similarly designed so that fluid from the lower port or passage 54 may be diverted for purposes incident to the use of the integral cylinder referred to. For present purposes, these details may be considered of no importance. They are illustrated here only to demonstrate the versatility of the system and the adaptation thereto of the adjunct provided by the present invention.

The control valve member 40 is provided at a lower portion thereof with a cam 86 which operates upon downward movement of the valve member 40 to unseat the lower check valve 62. A similar cam 88 is provided at an upper portion of the control valve member for unseating the upper check valve 64 in response to upward movement of the control valve member. Consequently, when the rockshaft 26 is rocked in a counterclockwise direction as viewed in Figure 3, the control valve member 40 will move upwardly, mechanically opening the upper check valve 64 to return fluid from the line 70 via the upper motor port 56. At the same time, the land 48 on the control valve member cuts off the upper portion of the valve bore 38 from the high-pressure passage 34—46 and the pressure rise in the lower portion of the valve bore 38 causes opening of the lower check valve 62, whereupon pump pressure is transmitted to the fluid line 76 via the motor port 54. It will be observed in Figure 8 that the tubular coupling 68 has an imperforate annular wall that cuts out the cored passage 84. The lower coupling 74 is, of course, identical.

Figure 1 illustrates one form of typical loader structure that may be used with the tractor. The tractor may be furnished or otherwise equipped with auxiliary supporting structure designated generally by the numeral 90. It will be understood that a similar supporting structure is fixed to the opposite side of the tractor. Each supporting structure includes an upright 92, to the lower end of which is pivoted at 94 the rear end of a forwardly extending lift arm 96. A portion of a similar lift arm 98 at the opposite side of the tractor is visible in Figure 1. A bucket or scoop 100 is suitably carried between the free or forward ends of the lift or loader arms 96 and 98. The bucket is raised or lowered in accordance with raising and lowering of the lift arms 96 and 98 by means of a pair of fluid motors designated generally by the numerals 102 and 104 (Figure 2). The motor 102 comprises a first motor member in the form of a cylinder 106 having its hollow interior constituting a fluid-receivable chamber 108 within which a work member in the form of a piston 110 is movable back and forth. The front end of the cylinder 106 may be suitably enclosed by a casting 112 having therein an axial bore through which slidably extends a piston rod 114 attached to the piston 110. The free end of the piston rod has thereon a clevis 116 for pivotal attachment at 118 to the left-hand loader arm 96 (Figure 1). The opposite end of the cylinder 106 is closed by a casting 120 which includes a clevis 122 for attachment at 124 to the upper end of the upright 92 of the supporting structure 90.

The right-hand fluid motor 104 is similarly arranged and carried at the right-hand side of the tractor. Since the details thereof amount to but a duplication of those of the left-hand motor 102, further elaboration is deemed unnecessary. There are shown in Figure 2, however, a piston 126 and a piston rod 128 for the right-hand motor 104.

As seen in Figure 3, the left-hand end of the motor chamber 108 constitutes a high-pressure end 130 and the opposite end constitutes a low-pressure end 132. These are connected respectively to the motor ports 54 and 56 by means including the fluid lines 76 and 70 respectively, as will appear in detail immediately below.

The right-hand end casting 120 of the cylinder 106 has therein a pair of cored passages 134 and 136. The passage 136 leads directly to the low-pressure end 132 of the motor chamber 108. The passage 134 leads via a tube 138 to a cored passage 140 in the casting 112 at the left-hand end of the cylinder 106. The passage 140 leads to the low-pressure end 130 of the motor chamber 108. In the specific embodiment of the invention illustrated, the upper portion of the end casting 120 provides a flat mounting surface for carrying on the motor 102 a by-pass valve housing designated generally by the numeral 142. This housing is equipped with a pair of fittings 144 and 146 by means of which fluid-transmitting connections may be made respectively with the fluid lines 76 and 70.

The fitting 144 communicates the fluid line 76 with a fore-and-aft extending passage 148 in the valve housing 142. This passage turns inwardly and thence downwardly at 150 (best seen in Figure 3) and leads to the cored passage 134 that ultimately finds its way to the high-pressure end 130 of the motor chamber 108. Accordingly, when the rock-shaft 26 in the main control valve housing 24 is rocked in a counterclockwise direction to shift the control valve member 40 upwardly, the high-pressure end 130 of the motor chamber 108 is connected to pump pressure via the motor port 54 and the fluid line 74—76—148—150—134—138—140.

The by-pass valve housing 142 has therein an elongated valve bore 152 closed at its forward end by a plug 154 and leading coaxially at its other end to the fitting 146 and thus to the fluid line 70. The plug may have an extension 155 thereon which serves as a stop for one position of a shiftable by-pass valve member, designated generally by the numeral 156. A portion of the valve bore 152 intermediate its ends is provided as a chamber 158 which communicates via a passage 160 with the cored passage 136 that leads to the low-pressure end 132 of the motor chamber 108. Hence, disregarding for the moment the valve 156, it will be seen that the fluid line 70 interconnects the motor port 56 of the control valve 24 and the low-pressure end 132 of the motor chamber 108. Since the motor port 56 is connected to the reservoir when the motor port 54 is connected to the pump, it follows that, when the control valve member 40 is in its raise position, the low-pressure end 132 of the motor chamber 108 exhausts to the reservoir.

If the valve 156 were omitted, it might be said that the arrangement thus far described is largely conventional. That is to say, the control valve 24 operates like any other control valve of a two-way system and the motor 102 would have its ends alternately subjected to pump pressure while its opposite ends are exhausted to reservoir as the control valve member 40 is operated. However, a system of that character is distinctly disadvantageous when used as the motivating system for a tractor-mounted loader, for example. One defect is that accelerated lowering of the loader is desired but this cannot be achieved if the exhaust end of the motor has imposed thereon the many restrictions set up in a conventional system by the motor-to-reservoir fluid line. According to the present invention, as will be described below, this defect is absent.

The valve 156 comprises an elongated barrel 162 connected by a coaxial spindle portion 164 to a shorter coaxial barrel 166. The valve 156 is biased to its neutral position (Figure 4) by a coiled compression spring 168 which acts against the barrel 166 and against the plug 154 that closes the front end of the valve bore 152. The rear end of the valve barrel 162 abuts against an interior shoulder 170 on an end cap 172 at the rear end of the by-pass valve housing 142. This end cap receives the fitting 146 that connects the fluid line 70 to the valve bore 152.

When the valve is in its neutral position, the barrel part 166 blocks a short by-pass passage 174 that connects the high-pressure inlet passage 148 with an annular chamber 176 concentric with the valve bore 152. At the same time, the valve bore chamber 158 is in free communication with the low-pressure passage 160—136 and is also in communication with a reservoir passage 178 (Figure 7) that parallels the valve bore 152 and leads to an annular chamber 180, which chamber is cut off from the valve bore 152 by the valve barrel 162 in its neutral position.

The valve barrel 162 is drilled axially to provide a bore 182 which leads to a reduced counterbore 184. The junction of the bore 182 and counterbore 184 forms a valve seat 186 for receiving a ball check valve 188.

The ball 188 is backed up by a tubular follower 190 which in turn is backed up by a coiled compression spring 192 that seats at one end on a shoulder on the follower 190 and at its other end on a snap ring 194 within the barrel part 162.

The tubular follower 190 is perforated at 196 to minimize fluid restriction in the bore 182. The front end of the valve barrel 162 that projects into the valve bore chamber 158 is cross-drilled to provide a plurality of radial passages 198 for communicating the counterbore 184 and the chamber 158. The short valve barrel 166 and the connecting spindle 164 are axially drilled to provide a relief or vent passage 200.

In the particular loader design illustrated, the two fluid motors 102 and 104 are used in place of a single larger motor. The distinction is relatively immaterial insofar as concerns the present invention and accordingly duplicating details of the motor 104 have been omitted. Figure 2 shows paralleling connections to the motor 104 from the by-pass valve housing 142. These connections are accomplished by fluid lines 202 and 204 leading respectively to the front and rear ends of the motor 104. A passage 206 communicates with the high-pressure passage 148 in the valve housing 142 and affords a connection for the fluid line 202. A second passage 208 communicates with the valve bore chamber 158 and is suitably connected to the fluid line 204.

*Operation*

Loading of the loader bucket 100 is accomplished by driving the tractor forwardly into a pile of material with the bucket lowered as shown in Figure 1. When the bucket is filled, the loader arms may be raised slightly to tear loose any of the material that may tend to adhere to the pile, after which the tractor is reversed so that the bucket clears the pile. The machine may then be maneuvered to the point at which it is desired to empty the loaded bucket. Of course, if the bucket is to be dumped into a wagon or vehicle or on top of another pile, the loader arms may be elevated accordingly. After the bucket is dumped, the loader is maneuvered to clear the receiving vehicle, the bucket is lowered and the loader returns to the loading pile. This process is repeated until the particular job is done. It will be appreciated that efficiency in handling the machine is largely a combination of the skill of the operator and the ability of the machine to respond to such skill. When the machine is equipped with the system according to the present invention, the entire operation is materially accelerated, because virtually no time is lost in returning the bucket to its lowered or loading position.

When the loader is in its loading or lower position, the piston 110 will be at the front end of the motor chamber 108. When the loader is raised, the piston 110 moves to the rear end of the motor chamber. Thus, the motor may be said to contract, which is preferable as a matter of design, since bending stresses in the piston rod 114 are eliminated. However, the distinction is one of preference and is of no importance in connection with the invention.

The piston 110 is caused to move rearwardly in the cylinder by the connection of the front or high-pressure end 130 of the motor chamber 108 to pump pressure. This is accomplished by forward movement of the control valve lever 28, which causes counterclockwise rocking of the rockshaft 26, as viewed in Figure 3. The control valve member 40 is thus moved upwardly to connect the high-pressure passage 34 from the pump with the lower passage 58 so that the pressure rise in the lower part of the valve bore 38 forces the check valve 62 to open so that pump pressure is transmitted via the lower motor port 54, coupler 74, fluid line 76, fitting 144 and passages 148, 150, 134, 138 and 140 to the high-pressure end 130 of the motor chamber 108. During this stage of operation, the by-pass valve 156 is in its neutral position as shown in Figures 3 and 4 and the barrel part 166 cuts off the short by-pass passage 174 to the valve bore chamber 176.

Fluid from the low-pressure end 132 of the motor chamber 108 is exhausted to the reservoir 36–R in the following manner. Exhaust fluid from the passages 136 and 160 enters the valve bore chamber 158 and flows through the radial passages 198 in the front end of the valve barrel 162 and then into the counterbore 184 to unseat the ball valve 188 and thence through the bore 182 in the valve barrel 162 to the fluid line 70 and to the reservoir 36–R via the upper motor port 56 and passage 60, it being remembered that the upper check valve 64 will be mechanically opened by the cam 88 as the main control valve member 40 is shifted axially to its upper or raise position.

The operator may maintain any selected elevation of the bucket by returning the main control valve lever 28 to its neutral or hold position, whereupon the control valve member 40 is centered and both check valves 62 and 64 are seated by their springs so that the piston 110 in the motor 102 is hydraulically locked. Of course, the same result follows with respect to the right-hand motor 104.

Figure 5:
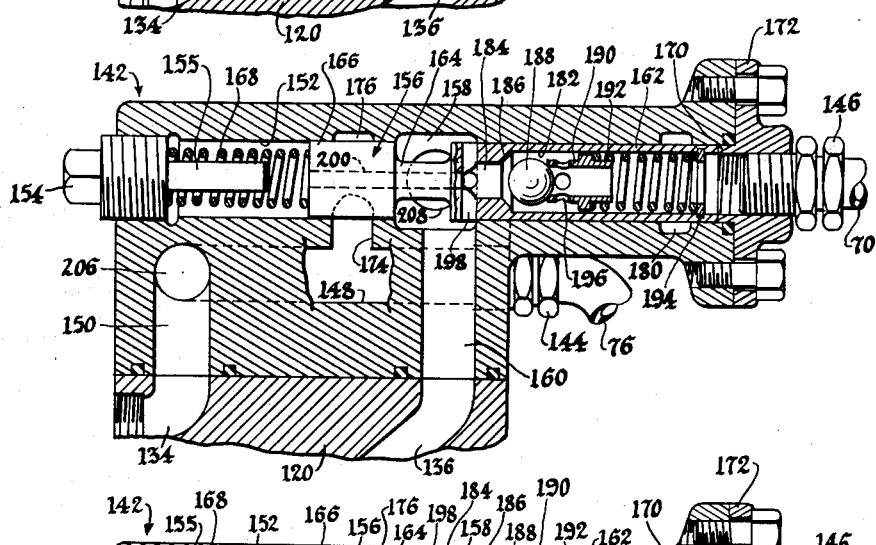
Figure 5 is a similar sectional view showing the position of the by-pass valve during raising of the loader.

Figure 5 shows the unseating of the ball check valve 188 in the by-pass valve 156 during raising of the loader so that exhaust fluid from the low-pressure end 132 of the motor chamber 108 may return to the reservoir of the system. As soon as the main control valve member 40 is returned to its neutral position, the spring 192 returns the ball 188 to its seat 186. It will be observed that in neither of the neutral or hold positions of the by-pass valve 156 is the position of the valve as a whole changed. Consequently, the relationship of the forward end of the valve barrel 162 to the valve bore chamber 158 remains unchanged. Likewise, the valve bore chamber 180 that is connected to the exhaust passage 178 is still cut off by the rear part of the barrel 162.

Figure 6:
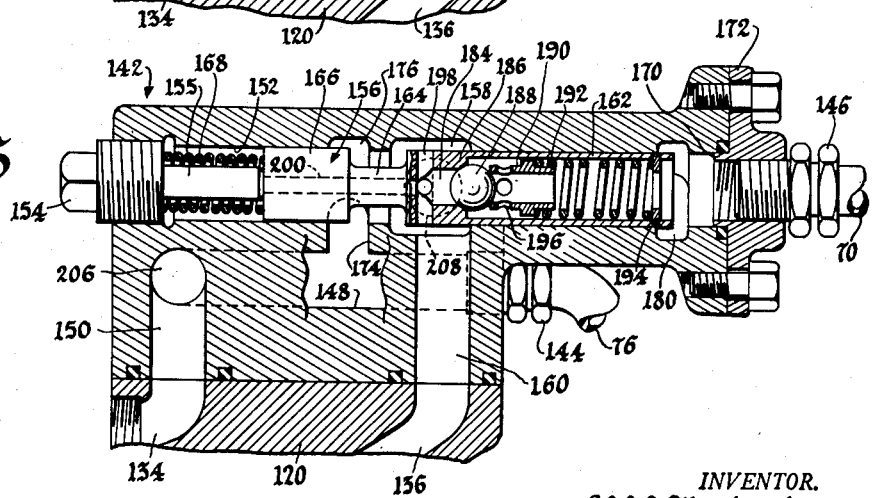
Figure 6 is a similar sectional view showing the position of the by-pass valve during lowering of the loader.

The operator lowers the loader by rocking the rockshaft 26 in a clockwise direction as viewed in Figure 3 so that the rockshaft arm 44 assumes the angular position indicated by the letter L. Thus, the control valve member 40 is moved downwardly to connect the upper motor port 56 to the pump and the lower motor port 54 to the reservoir. Accordingly, pump pressure is transmitted via the coupling 68 and fluid line 70 to the rear end of the valve bore 152. Since the ball check valve 188 is seated by the spring 192, the combined areas at the rear end of the barrel 162 present a fluid-pressure-receivable area subject to pump pressure transmitted by the line 70, which pressure is sufficient to overcome the biasing spring 168 so that the entire by-pass valve 156 is shifted to the front as shown in Figure 6, being stopped in its new position by the stop 155, whereupon the valve barrel 166 uncovers the by-pass passage 174 so that communication is established between the valve bore chambers 176 and 158. Since the by-pass passage 174 is in communication via the passage 148, passage 150 and passage 134 with the high-pressure end 130 of the motor chamber 108 and since the valve bore chamber 158 communicates via the passages 160 and 136 with the low-pressure end of the motor chamber 108, the now communicated passages establish a fluid line interconnecting the high- and low-pressure ends of the motor chamber. Because of the weight of the descending bucket and loader arm structure, the piston 110 moves rapidly forwardly in the cylinder 106 and the fluid escaping from the front or high-pressure end 130 of the motor chamber 108 may flow with virtually no restriction not only to the main reservoir 36–R but to the reservoir now afforded by the low-pressure end 132 of the chamber 108. It will be observed, of course, that as the piston 110 moves forwardly, the rear end 132 of the chamber 108 is correspondingly enlarged and there is no pressure in this end of the chamber to oppose the free entry of fluid exhausted from the front end of the motor chamber. At the same time, the line 148–76 is open to the reservoir 36–R through the upper motor port 56, motor passage 60 and exhaust passage 52 in the control valve housing 24. Therefore, the reservoir afforded by the low-pressure end 132 of the chamber 108 supplements the main reservoir, which necessarily results in a material increase in the speed of descent of the bucket and loader structure.

During the exhaust of fluid through the by-pass passage set up by the passages 148–174 and the now communicated valve bore chambers 176 and 158, the ball check valve 188 is, of course, seated by the combination of the spring 192 and pump pressure from the line 70.

Another factor of importance is that the reservoir provided by the low-pressure end of the motor chamber 108 is relatively close to the front end of the motor chamber. The capacity of the continually enlarging rear end of the motor chamber 108 as far as concerns volume is clearly adequate to accommodate the exhaust just described. Since the fluid therefor has now a shorter distance to travel, and since the by-pass valve 156 is designed with a minimum of restriction, there is little likelihood that the temperature of the fluid will be materially increased. Also, the shorter distance to travel and the relatively few restrictions virtually eliminate frothing, thus minimizing complications due to air bubbles. Lower fluid temperature means that the entire system may be more economically manufactured, since expensive and complicated fluid seals are not required.

Figure 7:
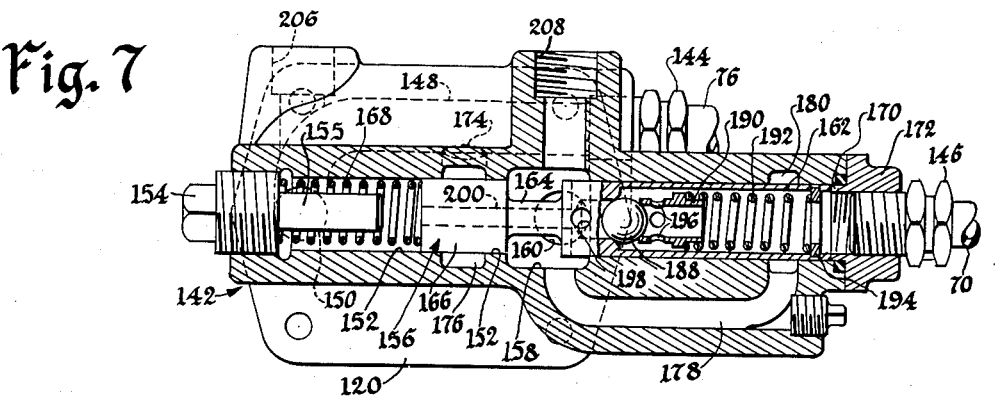
Figure 7 is a transverse sectional view taken on the line 7—7 of Figure 4.

It will be appreciated that the volume of fluid at pump pressure in the line 70 will be more than enough to shift the by-pass valve 156 to the position of Figure 6. However, excess fluid may escape via the exhaust chamber 180 and exhaust passage 178, since as the valve 156 moves forwardly, the valve bore chamber 180 is uncovered by the rear end of the valve barrel 162. As shown in Figure 7, the exhaust passage 178 leads to the valve bore chamber 158 which in turn communicates with both passages 160 and 148 when the shifted by-pass valve 156 establishes communication between the valve bore chambers 176 and 158. The stop 155 is selectively positionable to the extent that, if desired, it could be removed to secure double action of the by-pass valve. That is to say, in the absence of the stop 155, the valve member 156 could be shifted to the left beyond its Figure 6 position so that the barrel 162 would isolate the chamber 176 from the chamber 158 and would thus render the by-pass 174 ineffective. Fluid pressure building up in 178—180—158—160 would then be effective to force rather than merely follow the piston 110 to the left or on its lowering stroke, which result would be useful in cases in which it is desired to force the bucket 100 downwardly, which would be feasible if the bucket were replaced with a bulldozer blade, for example.

Summary

Various features of the invention not specifically enumerated will undoubtedly occur to those versed in the art, as likewise will numerous modifications and alterations in the preferred embodiment disclosed, all of which may be achieved without departing from the spirit and scope of the invention.

What is claimed is:

1. A by-pass valve of the character described, comprising: a valve body having a valve-receiving bore therein and a fluid inlet leading to one end of the valve bore; a first motor passage in the body fluid-connected to the valve bore; a second motor passage in the valve body separate from the first motor passage and independent of the valve bore; a by-pass in the body and fluid-connecting the second motor passage and the bore; a valve member shiftable in the bore between first and second positions and biased to its first position to cut off the by-pass from the bore, said valve member having a passage therein opening at one end to the fluid inlet and opening at its other end to the first motor passage, and a check valve in the valve member passage effective to open to return fluid in the first motor passage and effective to close said valve member passage to inlet fluid, said closed check valve providing a fluid-receivable area against which inlet fluid operates to move the valve member to its second position, said valve member having a fluid-conducting portion effective in said second position to retain the fluid connection between the bore and the first motor passage and to open the by-pass to the bore so that the first and second motor passages are fluid-connected via the by-pass and the bore.

2. The invention defined in claim 1, in which: the valve housing has an auxiliary passage opening at one end to the valve bore adjacent to the coupling means and leading to the first passage and by-passing the check valve; and the valve member has a portion effective in the first position of said valve member to cut off the auxiliary passage and effective in the second position of the valve member to open said auxiliary passage for bypassing to the first motor passage inlet fluid in excess of that required to maintain the second position of the valve member.

3. The invention defined in claim 2, in which the valve housing carries an adjustable stop normally fixed to limit shifting of the valve member to its second position but selectively arrangeable to permit overtravel of the valve member beyond said second position, said valve member having a fluid-blocking portion effective upon the occurrence of said overtravel to re-close the by-pass and said valve member upon the occurrence of said overtravel retaining the connection of the relief passage to the first passage so that said auxiliary passage serves to transmit inlet fluid to said second motor outlet.

4. A by-pass valve of the character described, comprising: a valve housing having a valve-receiving bore therein; a pressure and return passage in the housing leading to the bore and having a fluid inlet; a first motor passage in the housing leading to the bore; a valve member shiftable in the bore between first and second positions and normally biased to its first position, said valve member having a passage therethrough opening at one end to the pressure and return passage and opening at its other end to the first motor passage; a check valve in the valve member passage effective to open to return fluid from the first motor passage and to close to inlet fluid from the pressure and return passage, said closed check valve affording a fluid-receivable area enabling inlet fluid from the pressure and return passage to shift the valve member to its second position; a second motor passage in the housing separate from the first motor passage and the pressure and return passage and independent of the valve member; and by-pass means independent of the valve member passage and connectible and disconnectible between the motor passages respectively in the second and first positions of the valve member.

5. A by-pass valve of the character described, comprising: means including a first motor passage having an inlet and an outlet, said passage including a check valve therein arranged to permit fluid flow from its outlet to its inlet but not vice-versa; a second, permanently open motor passage having an inlet and an outlet; a by-pass line connected to the second motor passage and communicating with the first motor passage at the outlet side of the check valve; and a by-pass valve biased to a first position closing the by-pass line and movable to a second position opening the by-pass line in response to fluid-pressure rise in the first passage at the inlet side of the check valve.

6. The invention defined in claim 5, in which: the first passage includes a valve chamber; the communication of the by-pass line with the first passage is via the valve chamber; the by-pass valve is movably carried in the valve chamber to open and close the by-pass line; the by-pass valve has a check valve seat therein; and the check valve is incorporated in the by-pass valve and cooperates with the check valve seat to permit fluid flow through the by-pass valve from the outlet to the inlet of the first motor passage, said check valve when seated affording a fluid-pressure-receiving area exposed to fluid-pressure rise in the first motor passage at the inlet side of said check valve for moving the by-pass valve to its second position.

7. The invention defined in claim 5, including: a fluid exhaust line connected to the first motor passage at the inlet side of the check valve; means connected to the by-pass valve and cooperating with the fluid exhaust line to close the fluid exhaust line when the by-pass valve is in its first position and to open the fluid exhaust line when the by-pass valve is in its second position for exhausting from the first motor passage at said inlet side of the check valve fluid in excess of that required to hold the by-pass valve in its second position.

8. The invention defined in claim 7, in which: the exhaust line leads to one of the fluid passages in by-passing relation to the check valve.

References Cited in the file of this patent

UNITED STATES PATENTS

| | | |
|---|---|---|
| 2,267,284 | Livers | Dec. 23, 1941 |
| 2,367,682 | Kehle | Jan. 23, 1945 |
| 2,543,989 | Rockwell | Mar. 6, 1951 |
| 2,581,430 | Mork et al. | Jan. 8, 1952 |
| 2,590,454 | Pilch | Mar. 25, 1952 |